Sept. 27, 1955  L. H. BUCKNER  2,718,873
ANIMAL TOY
Filed May 11, 1954

Louis H. Buckner
INVENTOR.

BY *Clarence A. O'Brien
and Harvey B. Jackson*
Attorneys

United States Patent Office 2,718,873
Patented Sept. 27, 1955

2,718,873

ANIMAL TOY

Louis H. Buckner, Cleveland, Ohio, assignor to Blue Industries, Inc., Cleveland, Ohio, a corporation of Ohio Application May 11, 1954, Serial No. 428,952

4 Claims. (Cl. 119—29.5)

The present invention relates to new and useful improvements in animal toys particularly for use by cats or other felines whose playfulness is stimulated by a container of catnip attached to the toy.

An important object of the invention is to provide a coiled resilient member adapted to freely roll or bounce on a floor with comparatively slight effort on the part of a cat and supporting a cloth bag containing catnip internally of the member to attract the cat thereto.

Another object is to provide a device of this character of simple and practical construction, which is effective in its intended purpose, and inexpensive to manufacture.

Figure 1:
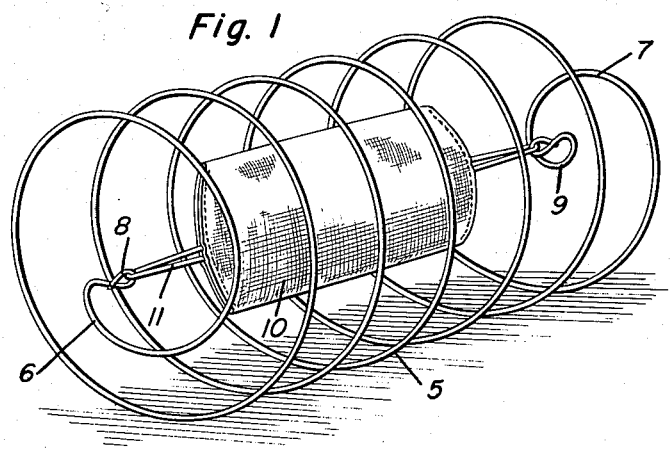
Figure 2:
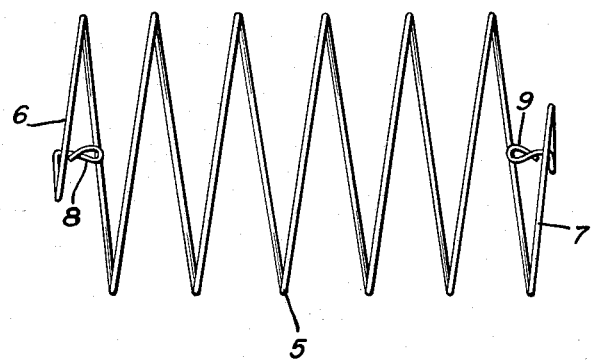
Figure 3:
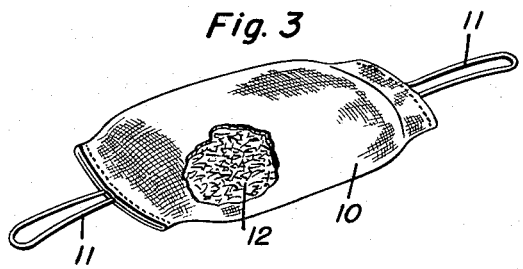

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view;
Figure 2 is a side elevational view; and
Figure 3 is a perspective view of the catnip bag.

Referring now to the drawing in detail, wherein for the purpose of illustration, I have disclosed a preferred embodiment of my invention, the numeral 5 designates a spirally coiled body of spring wire or other suitable resilient material having its endmost convolutions 6 and 7 formed with inwardly extending eyes 8 and 9 positioned in axial alignment with each other.

A bag 10 of cloth or other suitable flexible material is provided with loops 11 at its opposite end portions for attaching to the respective eyes 8 and 9 to tensionally support the bag in a taut position internally of the resilient body.

The bag is filled with catnip 12.

The coiled body 5 is free to roll or bounce on a floor by the action of a cat attracted to the bag of catnip to provide exercise for the cat and amusement to persons watching the antics of the animal.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An animal toy comprising in combination a coil spring, and a container adapted to hold a substance to which animals are attracted and attached under tension to each end of the spring internally of the latter to support the container in axially spaced relation with respect to the spring.

2. An animal toy comprising a resilient wire member shaped to form a plurality of spirally arranged convolutions and a container adapted to hold a substance to which animals are attracted and attached under tension to each end of the spring internally of the latter to support the container in axially spaced relation with respect to the spring.

3. An animal toy comprising a resilient wire spirally coiled member, inwardly projecting eyes at the endmost convolutions of the member, and a container adapted to hold a substance to which animals are attracted and attached to said eyes for supporting the container internally of the member.

4. An animal toy comprising a resilient wire spirally coiled member, inwardly projecting eyes at the endmost convolutions of the member, and a bag adapted to contain a substance to which animals are attracted and attached to said eyes for supporting the bag internally of the member.

References Cited in the file of this patent

UNITED STATES PATENTS

| | | |
|---|---|---|
| 872,792 | Boyle | Dec. 3, 1907 |
| 1,441,095 | Kahnweiler | Jan. 2, 1923 |
| 1,459,192 | Bell | June 19, 1923 |
| 1,599,886 | Graham | Sept. 14, 1926 |
| 1,622,143 | Hope | Mar. 22, 1927 |
| 2,464,665 | Anderson | Mar. 15, 1949 |
| 2,638,697 | Schwartz | May 19, 1953 |

FOREIGN PATENTS

| | | |
|---|---|---|
| 118,867 | Switzerland | Feb. 16, 1927 |
| 627,553 | France | June 11, 1927 |
| 410,220 | Great Britain | May 17, 1934 |